United States Patent [19]

Mosser et al.

[11] Patent Number: 5,223,444
[45] Date of Patent: Jun. 29, 1993

[54] METHOD FOR MAKING A PRESSURE SENSOR OF THE SEMICONDUCTOR-ON-INSULATOR TYPE

[75] Inventors: Vincent Mosser, Vanves; Ian Suski, Antony; Joseph Goss, Paris; Robert Leydier, Bures-Sur-Yvette, all of France

[73] Assignee: Societe D'Applications Generales, Paris, France

[21] Appl. No.: 761,119

[22] Filed: Sep. 17, 1991

Related U.S. Application Data

[62] Division of Ser. No. 479,889, Feb. 14, 1990, Pat. No. 5,081,437.

[30] Foreign Application Priority Data

Feb. 15, 1989 [FR] France ............................. 89 01988

[51] Int. Cl.$^5$ ............................................. H01L 21/205
[52] U.S. Cl. .......................................... 437/21; 437/62; 437/228; 437/233; 437/901
[58] Field of Search ................... 437/21, 901, 62, 83, 437/101, 228, 233

[56] References Cited

U.S. PATENT DOCUMENTS

| 4,003,127 | 1/1977 | Jaffe et al. ............................. 437/192 |
| 4,510,671 | 4/1985 | Kurtz et al. ............................. 437/24 |
| 4,670,969 | 6/1987 | Yamada et al. ......................... 437/84 |
| 4,672,354 | 6/1987 | Kurtz et al. ............................. 437/9 |
| 4,975,390 | 12/1990 | Fujii et al. ............................. 437/228 |

OTHER PUBLICATIONS

Onuma et al., "Piezoresistive elements of Polycrystalline Semiconductor thin-films", Sensors and actuators, 13 (1988) Jan., No. 1, pp. 71–77.

E. Obermeier, "Polysilicon layers lead to a new generation of pressure sensor", IEEE, Transducers '85.

International conference of solid state sensors and actuators, Digest of Technical Papers, 1985, pp. 430–433, New York, U.S.

Primary Examiner—Olik Chaudhuri
Assistant Examiner—Ourmazd S. Ojan
Attorney, Agent, or Firm—Larson and Taylor

[57] ABSTRACT

The method of making a pressure sensor formed of semiconductor material on an insulating support, i.e., as a semiconductor-on-silicon, is described. The sensor is comprised of four piezoresistive gauges formed in the semiconductor material. Two of the gauges, each have a pair of limbs joined by a base, such that they are U-shaped, and two others are I-shaped. Each of the four gauges comprise two half-gauges, and each half-gauge comprises an elongated sensing zone in semiconductor material and having a reduced width in the plane of the insulating support. Two ohmic contact zones are disposed at the ends of each of the half-gauges, and two connection zones in semiconductor material and of greater width are disposed between the sensing zones and the ohmic contact zones, the form of the two connection zones are the same for each of the eight half-gauges.

6 Claims, 10 Drawing Sheets

METHOD FOR MAKING A PRESSURE SENSOR OF THE SEMICONDUCTOR-ON-INSULATOR TYPE

This application is a division of U.S. patent application Ser. No. 07/479,889, filed on Feb. 14, 1990, now U.S. Pat. No. 5,081,437, entitled A PRESSURE SENSOR OF THE SEMICONDUCTOR-ON-INSULATOR TYPE, AND A PIEZORESISTIVE ELEMENT SUITABLE THEREFOR."

BACKGROUND OF THE INVENTION

The present invention concerns a pressure sensor of the semiconductor-on-insulator type, and a piezoresistive element suitable for incorporation in such a sensor.

Pressure sensors of the diffused gauge type are well known. European Patent Application No. 109992 describes such a sensor. A very thin deformable diaphragm is formed by machining in a semiconductor wafer, for example of silicon, and a border is left in existence around the diaphragm for mounting the diaphragm in the body of the sensor. To measure the pressure or the pressure difference applied to the diaphragm, piezoresistive gauges are formed on the diaphragm by localized doping of the semiconductor material. In general, there are four diffused gauges mounted in a Wheatstone bridge. One possible solution for implanting the gauges is the following: two of the gauges are disposed in zones of the diaphragm where the stresses due to the pressure are positive, the other two being disposed in zones where the stresses due to the pressure are negative.

One of the problems raised by diffused gauge sensors resides in the fact that it is very difficult to achieve a thorough electrical isolation between the gauges, since they are formed by P-type implantation or diffusion in a substrate of N-type silicon and the insulation between each gauge and the substrate is formed by a PN junction. This insulation problem is further increased when the temperature to which this sensor is subjected increases. Typically, these sensors are limited to a temperature of 130° C.

The technology of silicon-on-insulator (SOI) permits the problem of insulation between the substrate and the gauges to be resolved. The article by E. Obermeier published in IEEE Transactions 1985, pages 430 to 433, describes such a pressure sensor. The silicon substrate is covered with an insulating layer, for example silicon oxide, and the piezoresistive gauges are individually formed on the insulating layer. As in the case of diffused gauges, the sensor comprises four gauges: two central gauges and two peripheral gauges. At the center of the diaphragm, the curve of stresses is "flat", that is to say that the zone of maximum stress is relatively "long". The two gauges disposed in this region are the I-shaped type, that is to say that they have a single part which has a substantial length. At the periphery of the diaphragm, on the contrary, the curve of stresses is very "pointed", that is to say that the zone of maximum stresses has a reduced length. This is why the gauges are placed in U-shapes which are each constituted by two half-gauges of reduced length (forming the limbs of the U) connected at one of their extremities by a conductive connection.

One of the problems in the implementation of these sensors resides in the fact that U- and I- shaped gauges have very different forms. Further, U- shaped gauges comprise two supplementary ohmic contact zones which introduce additional series resistance. It is therefore very difficult to give the four gauges identical resistances. Additionally, the resistance of the gauges themselves and the resistance of the metal-semiconductor contact (zone of ohmic contact) does not vary in the same way with temperature, which makes it impossible to balance the bridge at zero pressure for all temperatures in a given range of temperatures (offset effect). It should be added that if the electrical conductors which connect the gauges together do not all have the same electrical resistance, the effect of temperature variations on these conductors can also introduce drifts in the offset of the bridge. Offset compensation is generally achieved by external compensation elements, for example resistances, which do not have the same temperature coefficient as the gauges of the bridge. It is therefore more difficult to correct the offset in a satisfactory manner in a given range of temperatures as the initial offset to be compensated becomes larger.

Another difficulty resides in the fact that, to obtain an accurate measurement, it is necessary to protect the gauges with respect to electrostatic charges which can be produced on the surface of gauges of semiconductor material, or more precisely on the surface of the protective layer of the gauges. These charges have the effect, directly or indirectly, of modifying in a variable and random manner the cross section of the effective path for the current flowing in each gauge. In the case where the gauge is formed from doped polycrystalline silicon, the electrostatic charges can affect the carrier density in the gauge to a depth of up to 100 Å. To eliminate this effect, there is formed on each gauge an electrostatic screen which thus avoids the formation of electrostatic charges. The formation of these screens and their connection to the rest of the circuit are delicate operations, and risk in their turn introducing into the measurement bridge formed by the four gauges asymmetries leading to an unbalance of the bridge and inducing drifts with temperature.

An object of the invention to provide a pressure sensor on an insulating support capable of operating at high temperature (for example 200° C.), which has a bridge of piezoresistive semiconductor gauges having a more symmetrical geometry than bridges of the prior art, which permits the voltage unbalance of the bridge at zero pressure to be eliminated or at least very substantially reduced, so considerably simplifying the implementation of the compensation elements.

According to a first aspect of the invention disclosed herein and claimed in our parent application Ser. No. 07/479 889 now U.S. Pat. No. 5,081,437, the pressure sensor comprises an insulating support, four piezoresistive gauges formed on the insulating support in a semiconductor material, two gauges being U-shaped and two others being I-shaped, and is characterized in that each of the four gauges comprises two half-gauges, each half-gauge comprising an elongate sensing zone of semiconductor material and of reduced width in the plane of the support, two ohmic contact zones disposed at the ends of the half-gauge, and two connection zones in semiconductor material and of greater width disposed between said sensing zone and said ohmic contact zones, the form of the two connection zones being the same for the eight half gauges.

As a result of these characteristics, the global structure of the sensing element constituted by the four piezoresistive gauges is more symmetrical than in the embodiments of the prior art. Additionally, the particular disposition of the gauges permits the surface of the conducting parts serving to connect the gauges together and to the rest of the measurement bridge to be reduced.

Preferably, said sensor also comprises eight screen electrodes in conductive material, each screen electrode covering one of said half-gauges, one end of each screen electrode being electrically connected to a contact zone of the corresponding half-gauge.

A problem which can be encountered with semiconductor on insulator gauge sensors resides in the form of the piezoresistive gauges formed on the insulating support.

Thus, a component formed on an insulator typically comprises a flat insulating support, for example in silicon oxide, on which is disposed the component itself, which is of suitably doped semiconductor material. The component is defined by etching away an initial layer of the semiconductor material so as to leave in existence only the part of the layer necessary to make the component. The component therefore has the form of a "mesa" which stands proud of the upper surface of the insulating support.

In the case where the component is a piezoresistive element, the component ought to have the shape of an elongate bar of constant width. Often, however, the piezoresistive element is provided at each end of the bar with a rectangular electrical connection zone of which the width is greater than that of the bar, to minimize the dispersion of the resistivity characteristics in the manufacturing process.

To define the piezoresistive element and to connect it to the rest of the circuit of which it forms part, it is necessary to deposit on the element successive layers of various kinds, for example a passivation layer followed by a metallization layer followed by an insulation layer, etc. These different layers necessarily overflow or overlap the semiconductor layer defining the piezoresistive element. In a cross-sectional view, these overlapping layers may cause increased stress concentrations in a narrow region around the lateral corner edges of the piezoresistive layer. These stresses concentrations may cause in time a relaxation of the structure and result in some changes of resistivity of the piezoresistive material in that narrow region with corresponding uncontrolled offset variations.

SUMMARY OF THE INVENTION

It is therefore an object of the present invention to alleviate this problem.

According to this invention, there is provided a method of forming a piezoresistive element on an insulating support, the element comprising a useful zone of predetermined width and at each end of the useful zone, a connection zone, the method comprising the steps of depositing on said insulating support a layer of semiconductor material, and selectively etching away said layer so as to form a zone wider than said useful zone between said connection zones, said method further including locally doping a zone of said layer with a dopant conferring on said doped semiconductor material piezoresistive properties, said doped zone having the form of said useful zone and said connection zones.

Preferably, said connection zones are equal in width to said wider zone.

Another problem with SOI piezoresistive gauge sensors lies in the rather unexpected vulnerability of the gauges to damage by electrostatic discharge (ESD), particularly when they are made of doped polysilicon. This vulnerability is somewhat surprising, since diffused gauge sensors are not especially vulnerable to ESD, so that SOI piezoresistive gauge sensors might have been expected to be similar in this respect.

However, we have found that in diffused gauge sensors, the aforementioned PN junctions which serve to isolate each gauge from the substrate also operate as diode to limit the voltage which can be applied to the gauges, so providing them with intrinsic protection against ESD. This intrinsic protection is absent in SOI piezoresistive gauges, by virtue of the extremely good insulation provided by the insulating support.

This ESD problem can be overcome by providing a pressure sensor comprising an insulating support and at least one piezoresistive gauge formed in a semiconductor material on the insulating support, the sensor further including a zener diode, arranged to be reverse-biassed in normal operation of the sensor, connected in parallel with the gauge so as to protect it from damage by electrostatic discharge.

Because the diode is reverse biassed and normally operated well below its zener voltage, it does not affect the normal operation of the gauge.

BRIEF DESCRIPTION OF THE DRAWING

In the Drawing:

FIG. 5b is a vertical sectional view along the line BB of FIG. 5a;

DETAILED DESCRIPTION OF THE PREFERRED EMBODIMENT

With reference to FIGS. 1 to 5, a preferred embodiment of a pressure sensor of the silicon-on-insulator type according to the invention will be described.

Figure 1:
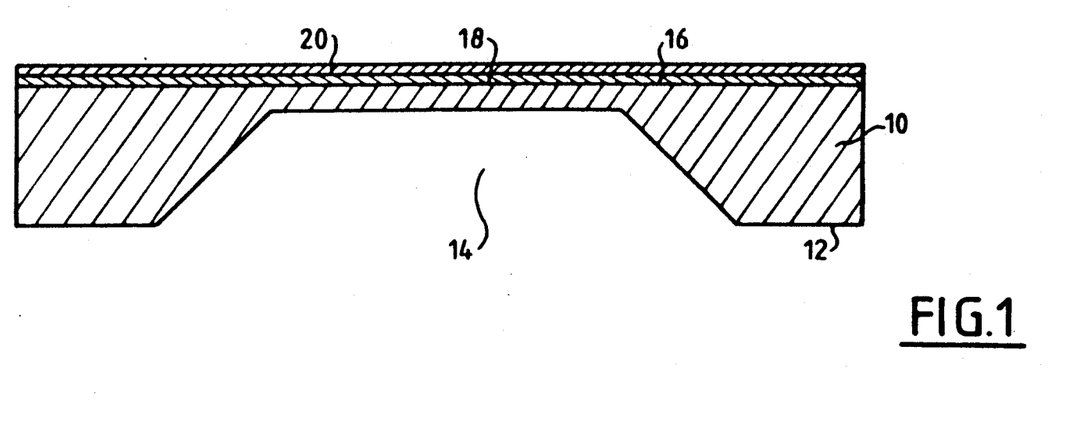
FIG. 1 is a vertical sectional view of a silicon element prepared for making a sensor according to the invention.

As FIG. 1 shows, the starting point is a silicon substrate 10 of which the rear face 12 is subsequently etched to form a cavity 14. The monocrystalline silicon preferably has the orientation [100] and the substrate has a thickness of the order of 500 micrometers. On the front face 16 of the substrate 10, a layer 18 of silicon oxide $SiO_2$ is formed, for example by oxidation of the silicon. The layer 18 preferably has a thickness of the order of 5000 Å. On the layer 18 of $SiO_2$, a layer 20 of polycrystalline silicon is formed. The layer 20 has a thickness of between 2000 Å and 5000 Å. The polycrystalline silicon is doped with boron with concentrations of boron of $10^{19}$ to $10^{20}$ atoms $cm^{-3}$. Several techniques can be used to form the polycrystalline silicon layer 20. In particular, the technology called LPCVD (Low Pressure Chemical Vapor Deposition) is cited.

Figure 2:
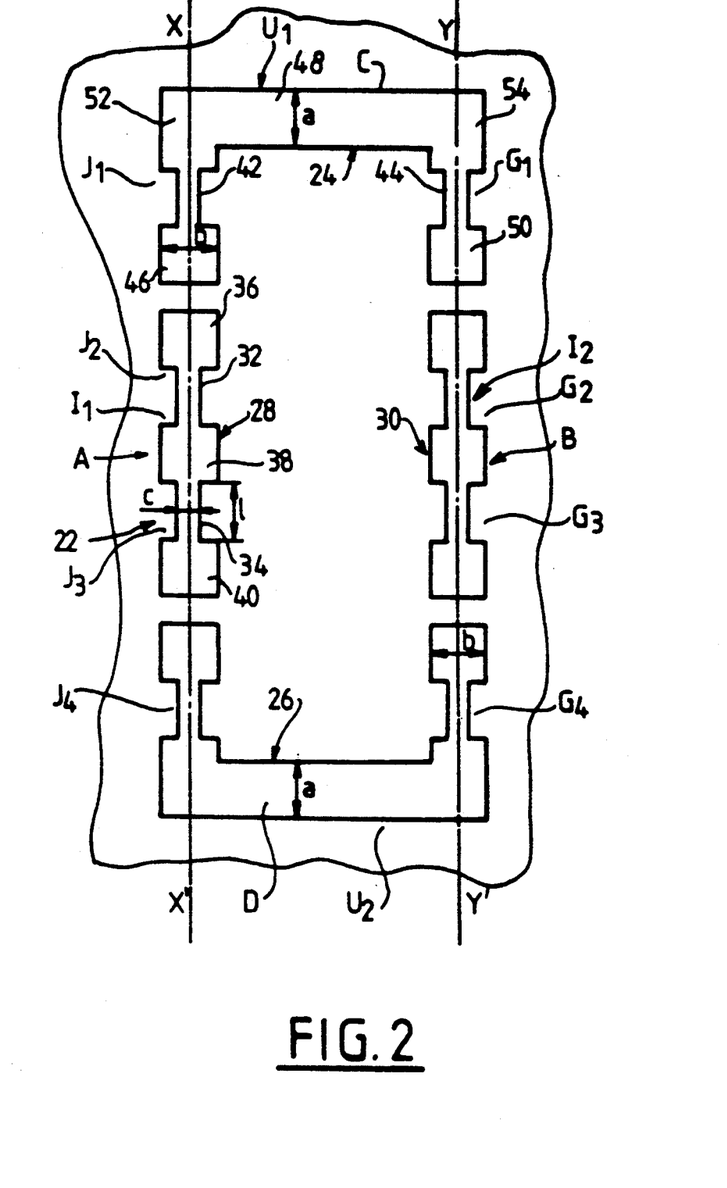
FIG. 2 is a plan view of the silicon element, illustrating the first etching step of the polycrystalline silicon.

In the following step illustrated in FIG. 2, the doped polysilicon layer 20 is etched away throughout its entire thickness so as to leave only the shape indicated globally by reference 22. The remaining part 22 has the general shape of a rectangle having two large sides A and B disposed along two parallel directions XX' and YY'. The large sides A and B are connected by small sides C and D perpendicular to the sides A and B. The small sides C and D have a constant width a. The large sides A and B are identical.

The remaining etched part 22 of polysilicon is formed of four elements 24, 26, 28, 30 respectively corresponding to U-shaped gauges $U_1$ and $U_2$ and to I-shaped gauges $I_1$ and $I_2$. The elements 24 and 26 are identical and the elements 28 and 30 are also identical. As has already been indicated, according to the invention each gauge is formed by two half- gauges. The gauges $U_1$ and $U_2$ are respectively formed by the half-gauges $J_1$, $G_1$ and $J_4$, $G_4$, and the gauges $I_1$ and 2 are respectively formed by the half-gauges $J_2$, $J_3$ and $G_2$, $G_3$. As FIG. 2 shows, the polysilicon elements forming the half-gauges $J_1$ to $J_4$ are disposed along the axis XX', while the half-gauges $G_1$ to $G_4$ are disposed along the axis YY'. Each half-gauge is constituted by a sensing or useful zone, two connection zones and two ohmic contact zones. At the level of the polysilicon, the sensing zone takes the form of an elongate bar of length l and width c. The connection zones of the half-gauges are defined by portions of width b of the elements 24 to 30 of polysilicon. The gauge $I_1$, as far as the polysilicon is concerned, comprises the sensing zones 32 and 34 and the end portions 36, 38 and 40, the portion 38 being common to the half-gauges $J_2$ and $J_3$. The gauge $I_2$ has exactly the same form. The gauge $U_1$ also comprises two sensing zones 42 and 44 of width c and length l, and three end portions 46, 46 and 50. The intermediate end portion has a special shape, since it is formed by the combination of the small side C and two portions 52 and 54 respectively disposed along the directions XX' and YY'. The gauge $U_2$ has exactly the same form as the gauge $U_1$.

Figure 3:
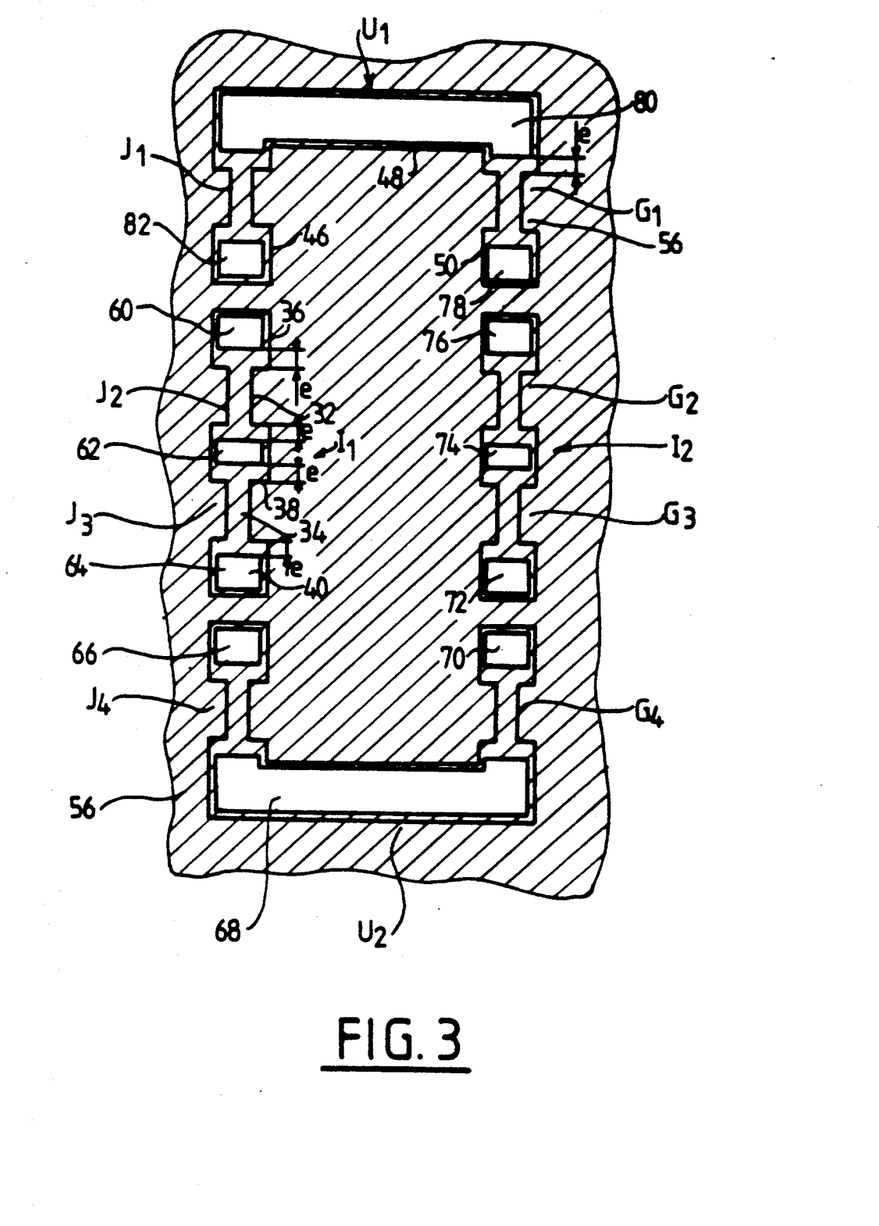
FIG. 3 is a plan view showing the second step of deposition and etching of a passivation layer.

In the following step, illustrated by FIG. 3, a passivation layer 56, typically of silicon nitride ($Si_3N_4$), is deposited over the whole piece to a thickness of about 1000 Å. The layer 56 covers the remaining parts 24 to 30 of polysilicon as well as the insulating layer 18. Then windows are produced in the layer 56. These windows, referenced 60 to 82, are arranged above each portion of polysilicon of width a or b, that is to say above each end portion. For the gauge $I_1$, the windows 60, 62 and 64 are arranged above the end portions 36, 38 and 40. For the gauge $U_1$, the windows 82, 80 and 78 are arranged above the end portions 46, 48, 50. For the gauges $I_2$ and $U_2$, there are identical dispositions. the windows all have a width d slightly less than the width a or b of the corresponding polysilicon portions. The extremity of each window is positioned exactly at a distance e from the extremity of the corresponding sensing zone. For example, the two edges of the window 62 disposed above the connection portion 38 of the gauge $I_1$ are respectively disposed at the distance e from the extremities of the sensing portions 32 and 34 of this same gauge. It is the same for the other windows of the other gauges referenced 66 to 82.

In the following step illustrated by FIG. 4, a first metallization consists, for example, of a layer 84 of a combination of titanium and tungsten of a thickness of 1000 Å to 1500 Å. The first metallization layer is etched away so as to leave only the parts shown in FIG. 4.

Figure 4:
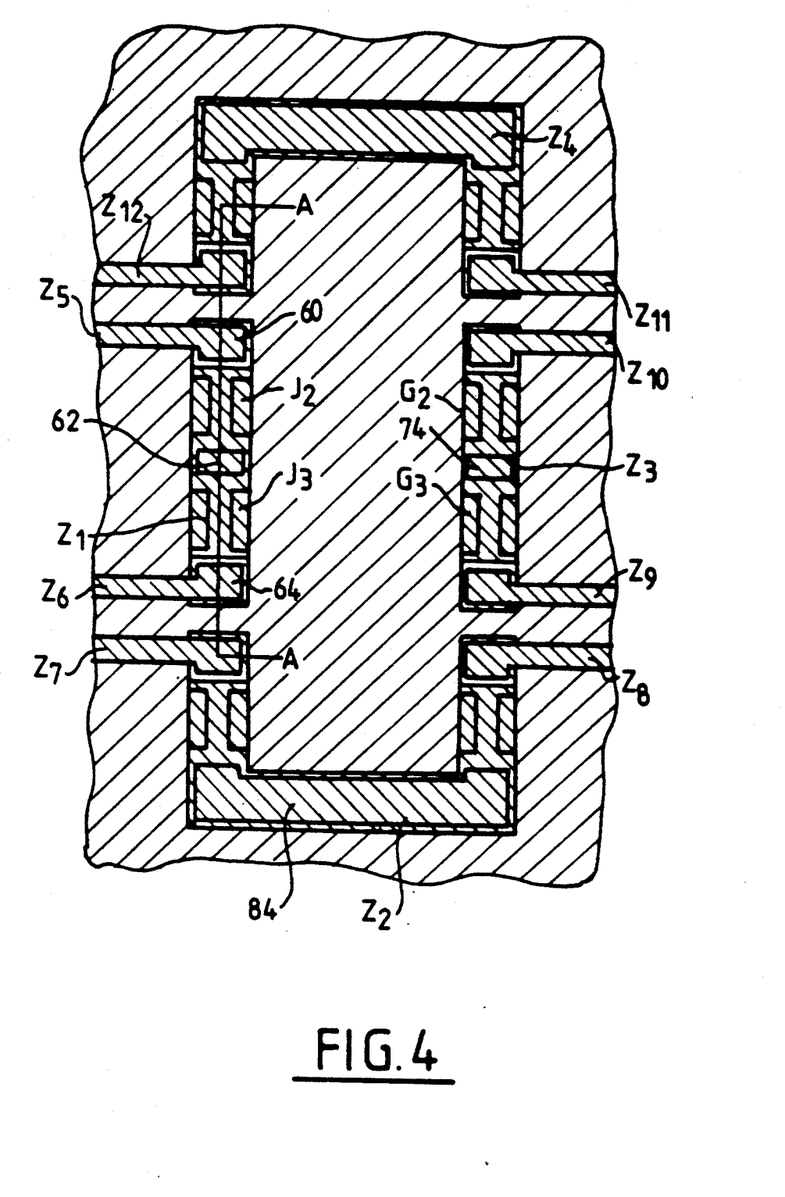
FIG. 4 is a plan view showing the third step of deposition and etching of a first metallization layer.

FIG. 4 shows that the first metallization layer 84 is constituted in fact by twelve zones $Z_1$ to $Z_{12}$ separated one from the other. Each of the metallization zones $Z_1$ to $Z_4$ is disposed above the sensing zones and the intermediate connection portion of a respective gauge. For example, for the gauge $I_1$, the metallization zone $Z_1$ covers the connection portion 38 and the sensing zones 32 and 34. The metallization $Z_1$ is connected by its central part directly to the polysilicon through the window 62. The rest of the metallization is insulated from the polysilicon by the passivation layer. the metallization zones $Z_5$ to $Z_{12}$ permit the connection of each end of each gauge to other elements of the bridge. They will be called interconnection metallization. One end of each of these metallizations $Z_5$ to $Z_{12}$ is disposed with respect to a window in such a manner that there is an electrical connection between this metallization and the polysilicon. For example, for the gauge $I_1$, the metallization $Z_5$ is partly facing the window 60 while the metallization $Z_6$ is partly facing the window 64. The metallizations $Z_1$ to $Z_4$ constitute "screen" electrodes for the gauges $I_1$, $I_2$ and $U_1$, $U_2$ respectively. The midpoint of a "screen" electrode is thus electrically connected to the midpoint of a gauge, that is to say to the intermediate connection portion which connects the sensing zones of the two half-gauges forming the gauge. It can equally be considered that each metallization $Z_1$ to $Z_4$ constitutes two "screen" electrodes covering the two half-gauges of the same gauge. The median part of each of these metallizations then serves to electrically connect each electrode to the midpoint of the gauge under consideration.

Functionally, the sensing element is completed with its two U-shaped gauges ($U_1$ and $U_2$), its two I-shaped gauges ($I_1$ and $I_2$) and its screen electrodes $Z_1$, $Z_2$, $Z_3$ and $Z_4$, and its connections to the bridge $Z_5$ to $Z_{12}$.

Figure 4A:
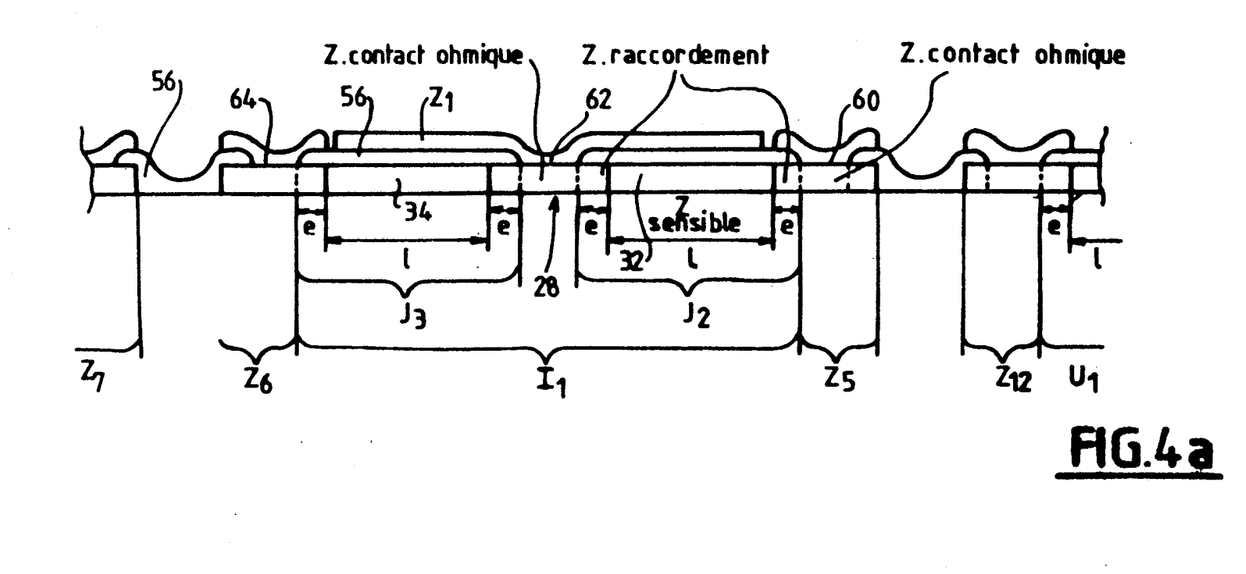
FIG. 4a is a vertical sectional view along the line AA of FIG. 4.

By reference more particularly to FIG. 4a, it will be better understood how the different parts are defined with great precision by virtue of the method of the invention.

If a half-gauge is considered, for example the half-gauge $J_3$, it comprises a sensing zone of width c and of length l. These dimensions were defined with precision during the etching of the layer 20 of polysilicon. The half-gauge $J_3$ also comprises two connection zones of width b, this width also being defined with great precision during the etching of the polysilicon. Each connection zone has a length e, which is also defined with great precision for the following reason: during the creation of the windows 62 and 64 (see FIG. 3), their extremities were created with great precision at the distance e from the extremities of the sensing zone 32. And the polysilicon in the windows 62 and 64 is directly in contact with the metallization layer 80. From the point of view of electric current flow, since the metal has an electrical conductivity very much higher than that of the polysilicon, all the current flows in the metal as if there were no polysilicon underneath it. The zones of polysilicon directly covered by the first metallization form the ohmic contact zone.

In this manner, eight polysilicon half-gauges $J_1$ to $J_4$ and $G_1$ to $G_4$ are obtained, which have exactly the same form particularly at the transition between the useful zone and the ohmic contact zones (windows 66 and 68). In effect, this transition is made by the connection zone, and the sixteen connection zones are identical. For example, the half-gauge $J_2$ is connected to the half-gauge $J_3$ by the portion of the metallization $Z_1$ bounded by the window 62; the half-gauge $G_2$ is connected to the half-gauge $G_3$ by the portion of the metallization $Z_3$ which is bounded by the window 74; and the half-gauge $J_1$ is connected to the half-gauge $G_1$ by the portion of the metallization $Z_4$ bounded by the window 80. According to the exemplary embodiment, the dimensions a and b are equal to 100 microns; l is equal to 100 microns; c is equal to 10 microns and e is of the order of 20 microns. The length of the large sides is equal to 1400 microns, and the length of the small sides is equal to 300 microns.

The way in which the screen electrodes are formed will now be described. The metallization $Z_1$ constitutes the screen electrode for the half-gauges $J_2$ and $J_3$. In effect, the metallization $Z_1$ covers these two half-gauges while being separated from them by the passivation layer 56. This screen electrode is connected to the rest of the circuit by the contact between the metallization layer 84 and the polysilicon through the window 62. Thus from the electrical point of view, the midpoint of this screen electrode is connected to the midpoint of the gauge $I_2$ formed by the half-gauges $J_2$ and $J_3$. It will be understood that the part of the metallization $Z_1$ which penetrates into the window 62 plays a triple role: it constitutes one of the ohmic contact zones for the half-gauges $J_2$ and $J_3$; it forms the electrical connection between these two half-gauges; and it connects to the bridge the screen electrodes covering the half-gauges $J_2$ and $J_3$.

If the U-shaped gauge $U_1$ is now considered, a similar disposition is found. The metallization $Z_4$, which covers the half-gauges $J_1$ and $G_1$, forms the screen electrode for this gauge. The electrical connection between the screen electrode and the rest of the electrical circuit is made through the window 80. The electrical connection between the half-gauges $J_1$ and $G_1$ is made by the portion of the metallization $Z_4$ bounded by the window 60. This portion of the metallization $Z_1$ therefore plays the dual role already explained in the preceding description of the gauge $I_1$.

Figure 5A:
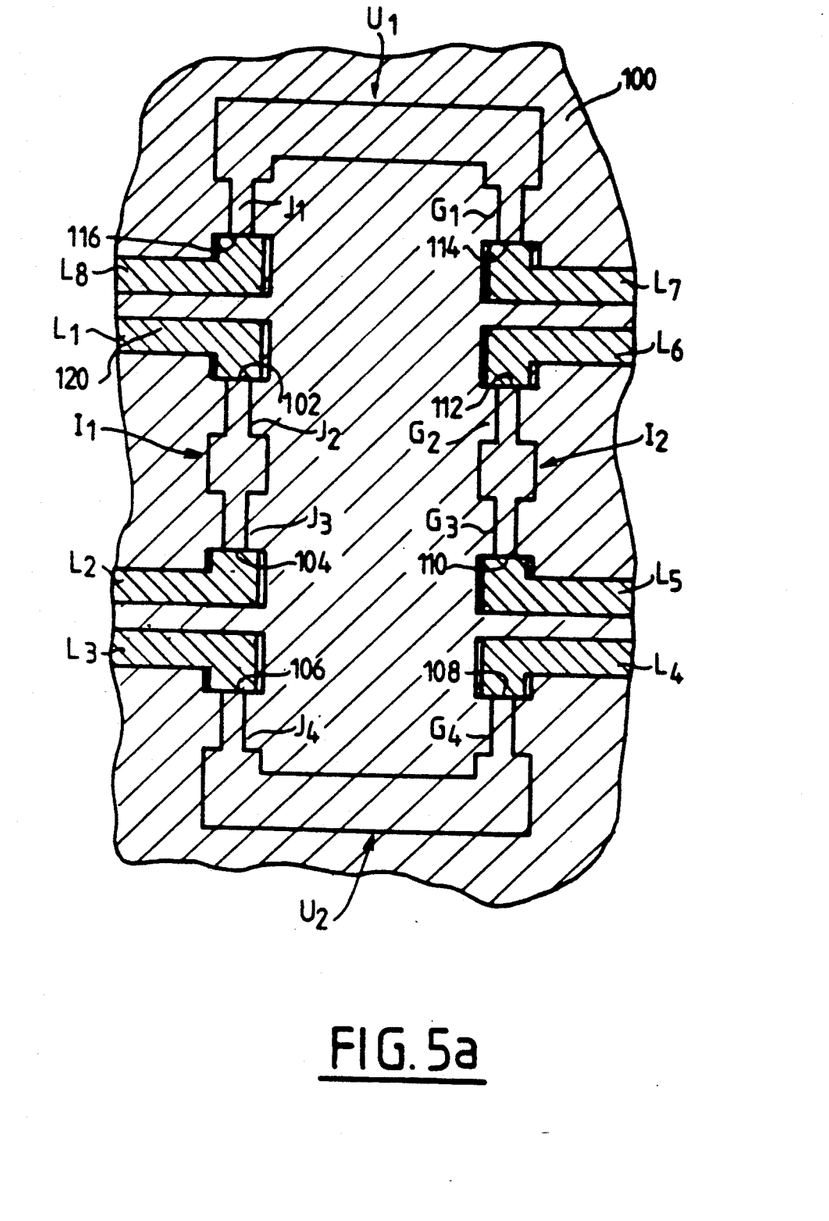
FIG. 5a is a plan view showing the steps of deposition and etching of a thick insulating layer and a second layer of metallization.

In the following step, illustrated by FIG. 5a, a thick insulating deposition 100 is made. It can be, for example, a deposition of silicon oxide of a thickness of about 6000 A. This deposition covers the entire sensing element. It is then etched away to form eight windows 102 to 116 which are disposed facing the portions of metallization 84 referenced $Z_5$ to $Z_{12}$. In these windows 102 to 116 the first metallization is exposed.

In the last step, a second metallic deposition 120 is formed (for example of aluminum), which penetrates into the windows 102 to 106. This deposition 120 is etched away to leave only the zones $L_1$ to $L_8$. These conductive zones serve to connect the four gauges of the sensing element of the sensor to the rest of the measurement bridge.

It can thus be seen that any desired components can be inserted between any two gauges of the bridge, for example to effect compensation with the help of resistances.

Figure 5B:
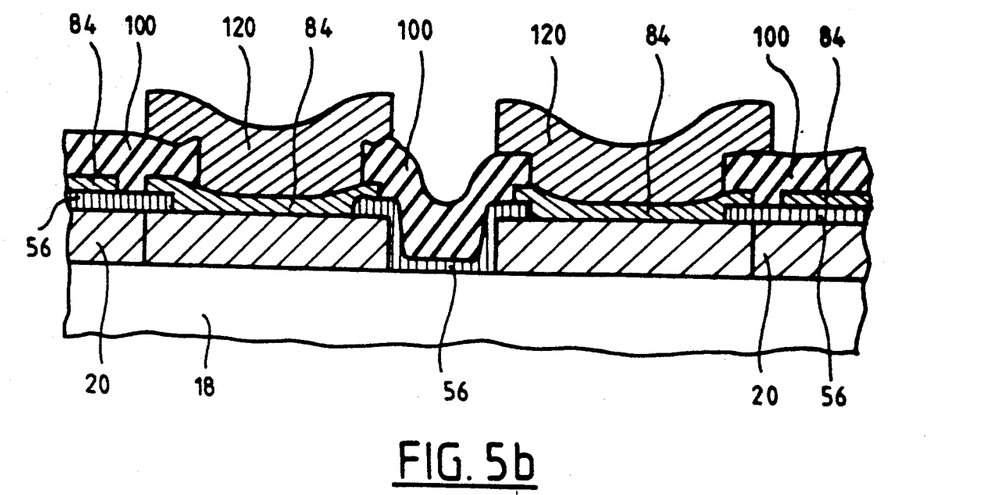

The build-up of the different depositions is best visible in FIG. 5b, which is a section in the zone of the second metallization 120.

The present invention has a number of advantages with respect to the techniques of the prior art. In the first place, thanks to the fact that the I-shaped gauges are formed by two half-gauges which are themselves strictly identical to the half-gauges forming the U-shaped gauges, the four gauges have exactly the same form as far as the piezoresistive portions which they comprise are concerned. In particular, the special features (passage from the useful zone of a half-gauge to the ohmic contact zone) are equal in number (four) in the four gauges, and the form of these special features is always the same.

As a result of this symmetrical and regular disposition, the effects of these special features rigorously compensate for each other when the whole sensing element is considered.

A sensor in accordance with the present invention can operate over a temperature range of $-50°$ C. to $200°$ C. with an offset voltage of less than 0.3 mV from the Wheatstone bridge.

Another advantage of the disposition of the gauges according to the invention is that the length of the interconnections between the gauges is significantly reduced with respect to the solutions of the prior art. As a result, differential thermal effects are also significantly reduced.

The preferred way of forming the screen electrodes also has a number of advantages. Each screen electrode has its midpoint electrically connected to the midpoint of each gauge (at the connection between the two half-gauges forming the gauge). However, it will be understood that the screen electrodes could be formed differently: each screen electrode covers a half-gauge (in all, eight screen electrodes). The electrode is then connected by one of its ends to the ohmic contact zone of the half-gauge which is not also the zone of contact for the gauge in question.

In the preceding description, each gauge has two ends which are terminated by an electrical connection, permitting the insertion in the bridge between two gauges of any desired components. However, as has been indicated, thanks to the particular structure of the gauges, the offset voltage is significantly reduced. It is therefore possible for certain applications to introduce no compensation elements for the unbalance voltage.

Figure 6A:
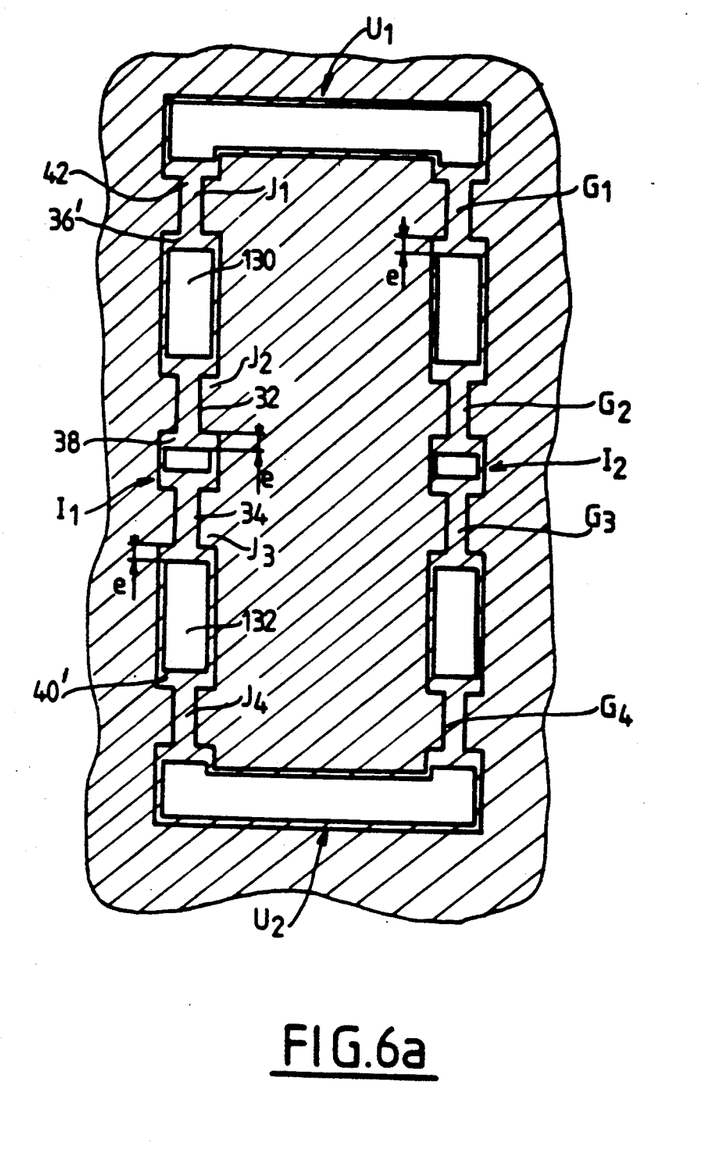
FIG. 6a and 6b are plan views showing a variant of the steps shown by FIGS. 2 to 4.
Figure 6B:
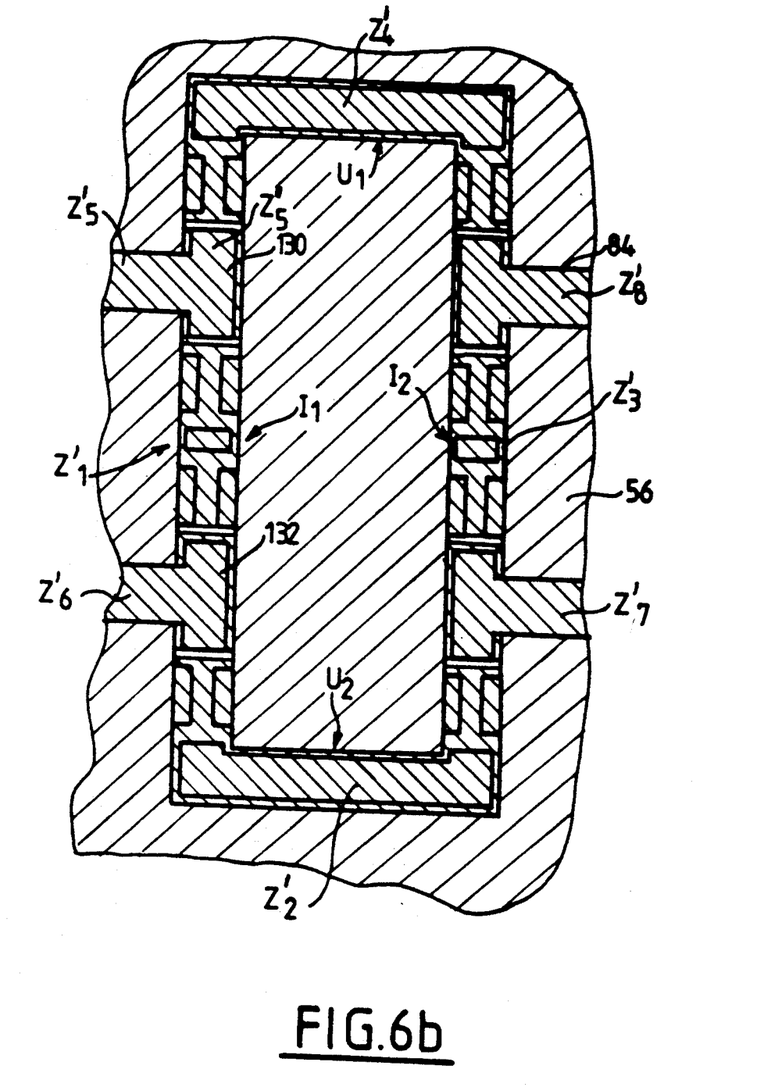

In this case, the implementation of the sensor can be slightly modified. This is what is shown in FIGS. 6a and 6b.

The essential difference resides in the way in which the electrical connection between the gauges is formed. As FIG. 6a shows, there is no separation, at the level of the polysilicon, between the different gauges. For example, between the sensing zones 32 and 34 of the half-gauges $J_1$ and $J_2$ (of FIG. 2), there is a single connection portion referenced 36'. Similarly, between the sensing zones of the half-gauges $J_3$ and $J_4$ there is a single connection portion 40'. As far as the windows opened in the passivation layer are concerned, one is found above each connecting portion. For example, the window 130 is found above the connection portion 36' and the window 132 above the connection portion 40'.

During the first metallization step (FIG. 6b), eight metallization zones $Z'_1$ to $Z'_8$ are formed. These metallizations $Z'_1$ to $Z'_4$ which cover the gauges are identical to the metallizations $Z_1$ to $Z_4$ of FIG. 4 and play the role of "screen" electrodes. The metallizations $Z'_5$ to $Z'_8$ are connection metallizations. They play a double role: on the one hand they connect together the ends of neighboring gauges; on the other hand, they permit the connection of the gauges to the rest of the bridge. For example, the metallization $Z'_5$ connects the gauge $I_1$ to the gauge $U_1$.

FIGS. 1 to 5 show a first embodiment of the sensor in which the gauges of the sensor are not initially connected to each other. In contrast, FIGS. 6a and 6b show a second embodiment in which the four gauges of the sensor are all interconnected. It is clear that between these two extreme solutions, several intermediate solutions can be adopted. For example, only the connection between the gauges $U_1$ and $I_2$ may be open.

Figure 7:
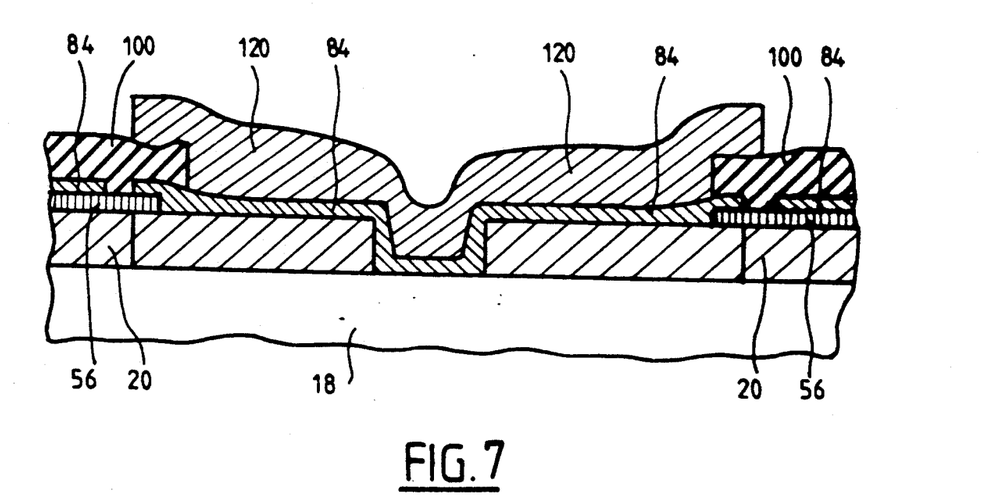
FIG. 7 shows another variant of the step shown in FIG. 5b.

The interconnection between two gauges can be made as in the case of FIGS. 6a and 6b. It can equally be arranging the metallization layer 84 to bridge the gaps between gauges etched as shown in FIG. 2: that is what FIG. 7 shows.

Figure 8:
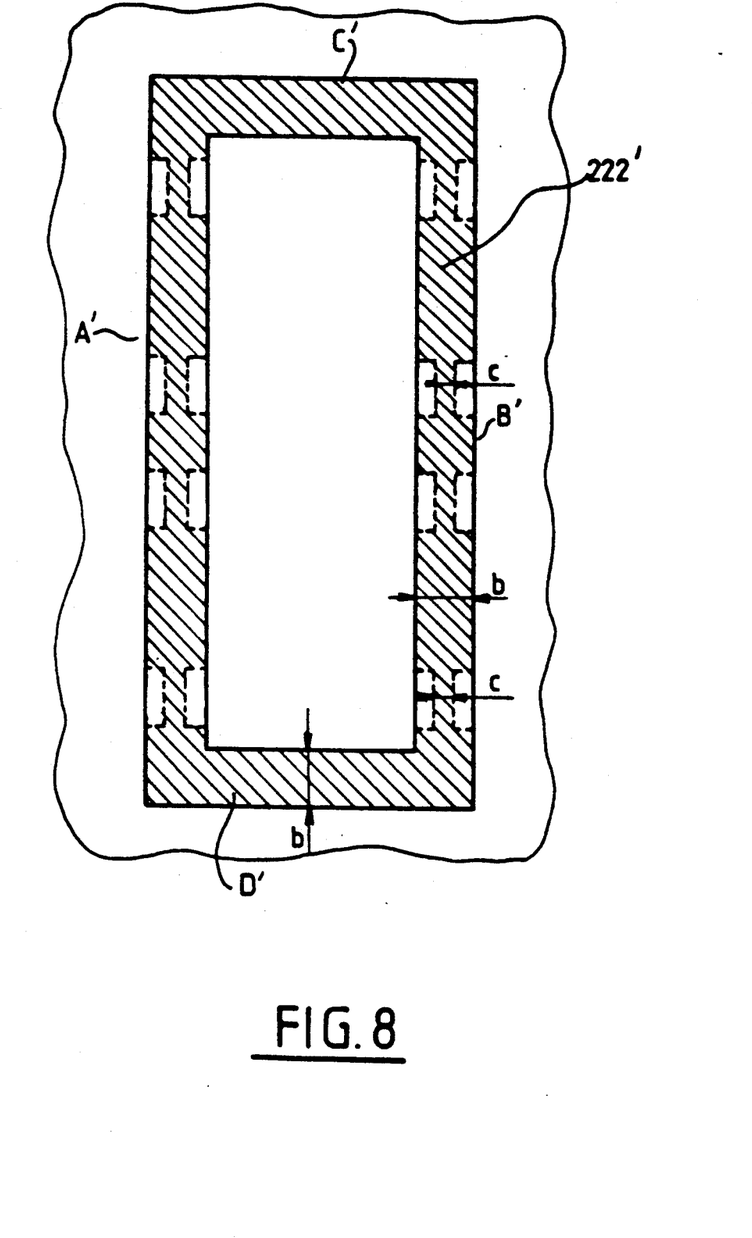
FIG. 8 shows a variant of the step of FIG. 2 according to the present invention, as that step is used in connection with the steps shown in FIGS. 6a and 6b.

In the embodiments described above, the layer of doped polycrystalline silicon was etched away to the insulating support to define the alternating zones of width b and of width c. As indicated hereinbefore, the rather sharp steps defined at the lateral edges of the zone of width c can cause a problem, so FIG. 8 illustrates, in accordance with the present invention a modification of the step of FIG. 2, as that step is used in conjunction with the steps of FIGS. 6a and 6b, for overcoming this problem. Thus the layer 20 of polysilicon is etched away to leave only the part 222'. The remaining part 222' is a hollow rectangle having two longer sides A' and B' and two shorter sides C' and D', the width of the sides being b throughout their entire length. The alternating zones of width b and of width c are obtained during the doping of the silicon, which is preferably carried out by ion implantation (which is very accurately controllable) prior to the etching step. The doped region is indicated by cross-hatching within dotted lines. This doped region has exactly the same shape as the portion left after the etching step of FIG. 2. The following steps of the method of fabrication are identical to those described above with reference to FIGS. 3 to 5b.

Clearly the modified doping technique described in relation to FIG. 8 can also be used in making the embodiment of the sensor described with reference to FIGS. 1 to 5.

Figure 9:
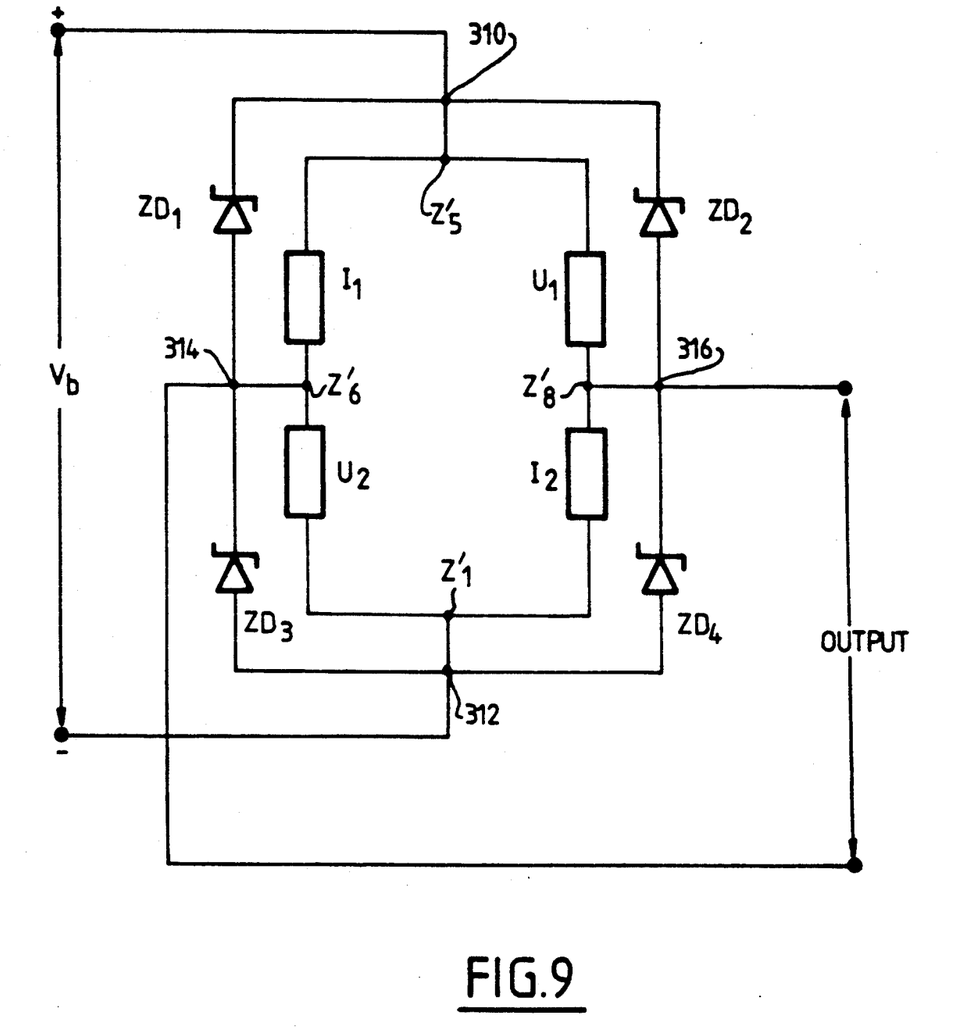
FIG. 9 is a simplified circuit diagram showing how the piezoresistive gauge of the embodiment of FIG. 6a and 6b is connected in a Wheatstone bridge and provided with ESD protection.

FIG. 9 shows how the gauges I, $I_2$, $U_1$ and $U_2$ of the embodiment of the invention described with reference to FIGS. 6a and 6b are connected to form a Wheatstone bridge. A stabilized bridge voltage $V_b$ is applied between pins 310, 312 of the sensor, the pin 310 serving as a positive pin and being connected internally of the sensor to the metallization $Z'_5$ of FIG. 6b and the pin 312 serving as a negative pin and being internally connected to the metallization $Z'_7$. The output of the sensor appears between pins 314, 316, which are connected internally of the sensor to the metallization $Z'_6$ and $Z'_8$ respectively.

As already mentioned hereinbefore, we have found that the polysilicon gauges $I_1$, $I_2$ are vulnerable to damage caused by ESD. This damage takes two mains forms, depending upon the magnitude of the ESD. For relatively small discharge currents, the structure of the polysilicon can be changed only slightly, but sufficiently to permanently change the resistance of the gauge affected and so introduce an offset into the Wheatstone bridge. For larger discharge currents, the polysilicon of the affected gauge can be completely ruptured (as if it were a fuse), and so render the gauge open circuit.

In order to protect the gauges $I_1$, $I_2$, $U_1$, and $U_2$ against ESD, respective zener diodes $ZD_1$ to $ZD_4$ are connected in parallel with each gauge. As can be seen in FIG. 9, the diodes $ZD_1$ to $ZD_4$ are all connected to be reverse-biassed in normal use: the respective cathodes of the diodes $ZD_1$, and $ZD_2$ are connected to the positive pin 310, while their respective anodes are connected to the pins 314 and 316 respectively; and the respective anodes of the diodes $ZD_3$ and $ZD_4$ are connected to the negative pin 312, while their respective cathodes are connected to the pins 314 and 316 respectively. Suitable zener diodes for use as the diodes $ZD_1$ to $ZD_4$ are those available under the designation JEDEC BZX 55 C 10, which have a sufficiently high resistance when reverse-biassed not to affect the normal operation of the sensor, and are capable of operating satisfactorily at temperatures in excess of 200° C.

Clearly, the embodiment of the invention described with reference to FIGS. 1 to 5 can be protected from the effects of ESD by four zener diodes in an exactly analogous manner.

We claim:

1. A method of forming a piezoresistive element on an insulating support, comprising the steps of:
   depositing on said insulating support a layer of semiconductor material; and
   selectively etching away said layer so as to form two connection zones and an intermediate zone extending between said connection zones, wherein a zone of said layer is locally doped with a dopant conferring on said doped semiconductor material piezoresistive properties, said doped zone having the shape of said connection zones and a useful zone of predetermined width extending between said connection zones, said intermediate zone including and being wider than said useful zone, whereby said piezoresistive element is comprised of said useful zone and said connection zones.

2. The method of claim 3, wherein said doping step is accomplished by ion implantation.

3. The method of claim 1, wherein said doping step is accomplished before said etching step.

4. The method of claim 1, wherein said insulating support is silicon oxide.

5. The method of claim 1, wherein said semiconductor material is doped polycrystalline silicon.

6. The method of claim 1, wherein said connection zones are equal in width to said intermediate zone.

* * * * *